United States Patent [19]

Bertani

[11] Patent Number: 5,676,388
[45] Date of Patent: Oct. 14, 1997

[54] ASSISTED WALKING APPARATUS

[76] Inventor: Gilbert A. Bertani, 5515 Dashwood, #79, Houston, Tex. 77081

[21] Appl. No.: 514,927

[22] Filed: Aug. 14, 1995

[51] Int. Cl.$^6$ .................................................. B62M 1/00
[52] U.S. Cl. .............................. 280/87.041; 280/250.1; 280/267; 482/68
[58] Field of Search .................... 280/250.1, 87.021, 280/87.041, 87.05, 267, 268, 269; 482/66, 68; 297/DIG. 4

[56] References Cited

U.S. PATENT DOCUMENTS

| | | | |
|---|---|---|---|
| 1,471,749 | 10/1923 | Monroe | 280/267 |
| 3,561,778 | 2/1971 | La Brie | 280/269 X |
| 5,511,809 | 4/1996 | Sagi | 280/267 X |

FOREIGN PATENT DOCUMENTS

| | | | |
|---|---|---|---|
| 115951 | 10/1942 | Australia | 280/267 |
| 73955 | 5/1893 | Germany | 280/267 |

*Primary Examiner*—Kevin Hurley
*Attorney, Agent, or Firm*—Bill B. Berryhill

[57] ABSTRACT

Walking apparatus for assisting a disabled person to walk. The apparatus includes a frame having a pair of lower horizontal members between which the person may stand and a vertical member extending upwardly for disposition behind the persons back. The apparatus also includes a forward pair of ground engaging wheels, each one of which is attached to a forward wheel mount which extends downwardly from a forward end of one of the lower horizontal members. The wheel mounts allow the wheels to pivot about a vertical axis. At least one rear ground engaging wheel is also attached to a rear wheel mount at the rear of the frame. A steering assembly is mounted on the frame and connected to forward wheel mounts. The steering assembly is manipulatable by the person's hands for pivoting of the forward pair of wheels about vertical axes to steer the apparatus in a desired direction.

19 Claims, 4 Drawing Sheets

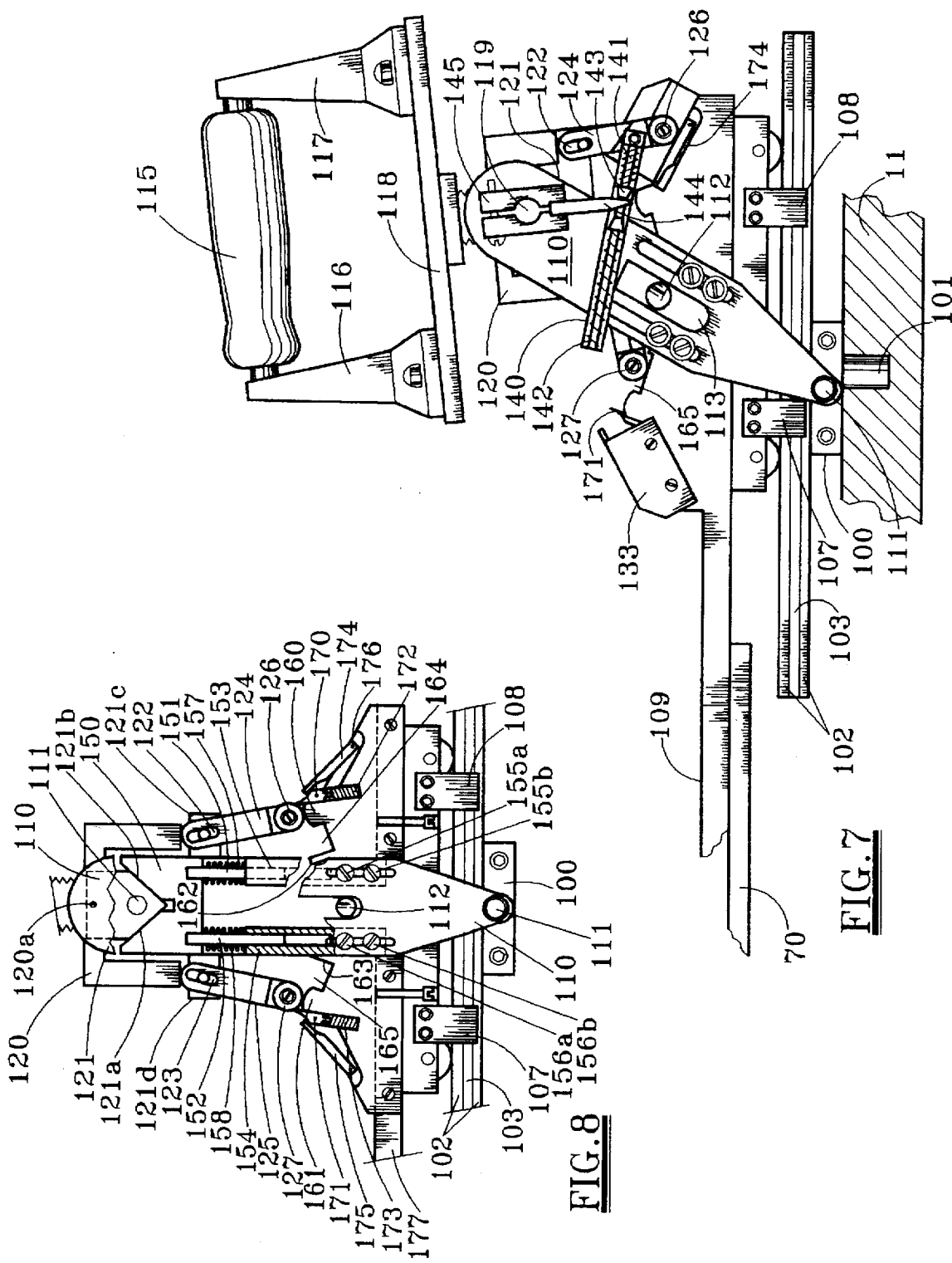

5,676,388

ASSISTED WALKING APPARATUS

BACKGROUND OF THE INVENTION

1. Field of the Invention

The present invention pertains to walking apparatus. More specifically, the present invention pertains to walking apparatus primarily designed to assist disabled persons in walking.

2. Description of the Prior Art

Disabled persons are frequently transported by means of wheelchairs. Such chairs are typically provided with a pair of large rear wheels mounted to rotate on fixed horizontal axes and a pair of smaller forward wheels typically mounted for swiveling movement about fixed vertical axes. The swiveled wheels allow the wheelchair to be turned from one side to another.

Most wheel chairs are pushed by someone other than the occupant or propelled by the occupant's turning of the large rear wheels with his hands. Some wheel chairs are provided with levers or other mechanisms by which the occupant may propel the wheel chair. Examples of such may be seen in U.S. Pat. Nos. 3,994,509; 4,453,729; 4,506,900; and 4,811,964. Some have even been designed for negotiating steps as seen in U.S. Pat. No. 4,964,942.

Many temporarily and permanently disabled persons are partially capable of walking and rather than needing a wheel chair, which does not enhance or strengthen walking capabilities, need some type of assisted walking apparatus. If properly assisted in walking, the disabled person may eventually regain the ability to walk with little or no assistance and to live a more independent life.

A simple assisted walking aid is the common walker which provides forward and rearward pairs of legs connected by support members and provided with upper hand engaging side rails which may be gripped by the hands of the disabled person standing between forward and rearward pairs of legs. To walk, the disabled person must lift the walker, place it somewhat forward, lean on the hand supports and move his body forward between the forward and rearward pair of legs, repeating these movements until the desired destination is reached.

Severely disabled persons may not be able to use a common walker, requiring greater support and/or assistance. For this reason, walking apparatus has been designed to provide greater assistance to a disabled person. For example, U.S. Pat. No. 3,778,052 discloses a wheel support structure providing a four legged open framework enclosure in which the disabled person may stand. This device also provides an adjustable crotch sling and belt assembly and adjustable crutch heads for positioning beneath the base of the arms. Although the apparatus of U.S. Pat. No. 3,778,052 is much more satisfactory than the common walker for severely disabled persons and for therapeutic purposes, it must be steered by movements of the body not readily attainable by some individuals of impaired movement. Further development is required for such individuals.

SUMMARY OF THE PRESENT INVENTION

The present invention provides walking apparatus for assisting a temporarily or permanently disabled person to walk. The apparatus comprises a frame which includes a pair of lower horizontal members between which the person may stand, a vertical member extending upwardly for disposition behind the person's back and a pair of upper horizontal members for disposition under the person's armpits. The apparatus is provided with a forward pair of ground engaging wheels each one of which is attached by a wheel mount which extends downwardly from a forward end of the lower horizontal members of the frame. The wheel mount allows the wheels to pivot about vertical axes. At least one rear ground engaging wheel is attached by a rear wheel mount to the rear of the frame. In addition, the walking apparatus includes a steering assembly mounted on the frame and connected to the forward wheel mounts and which is manipulatable by the hands of the person using the apparatus for pivoting of the forward pair of wheels to steer the apparatus in a desired direction.

The steering assembly of the walking apparatus of the present invention is unique. It includes a pair of driven sprockets each one of which is attached to one of the forward wheel mounts for rotation about the vertical axis thereof to effect pivoting of the forward wheels. A driving sprocket is mounted at the rear of the frame for rotation about a vertical axis. A chain assembly connects the driving sprocket with the driven sprocket and means are provided for rotating the driving sprocket so that the chain assembly rotates the driven sprockets, pivoting the pair of forward wheels to steer the apparatus in the desired direction.

The primary means for rotating the driving sprocket comprises a pair of handle assembles each one of which is attached to a corresponding one of the pair of lower horizontal frame members and a pair of arm assemblies, each one of which connects one of the handle assemblies to the driving sprocket. Each of the handle assemblies is engageable by one of the persons hands for movement thereof. Movement of the handle assemblies effects movement of the arm assemblies which in turn rotates the driving sprocket, activating the chain assembly to rotate the driven sprockets and to pivot the forward wheels for steering of the apparatus.

Thus, the walking apparatus of the present invention may be used to assist permanently or temporarily disabled persons in walking without further assistance by another person. It even allows the user to steer the apparatus with minimal effort and without certain body movements required by other walkers.

The walking apparatus of the present invention is particularly useful in providing physical therapy to temporarily walking impaired individuals. It can also be used by permanently walking impaired individuals to provide more independence and freedom of movement thereto. Many other objects and advantages of the invention will be understood from reading the description which follows in conjunction with the accompanying drawings.

BRIEF DESCRIPTION OF THE DRAWINGS

FIG. 7 is a side elevation view of the handle assembly of FIGS. 5 and 6 but showing the handle assembly in a forward position for steering of the walking apparatus in a particular direction; and FIG. 8 is a partial side elevation view of the handle assembly of FIGS. 5–7, in a neutral or intermediate position, parts of which have been removed or broken away to more clearly show inner components thereof.

DESCRIPTION OF A PREFERRED EMBODIMENT OF THE INVENTION

Figure 1:
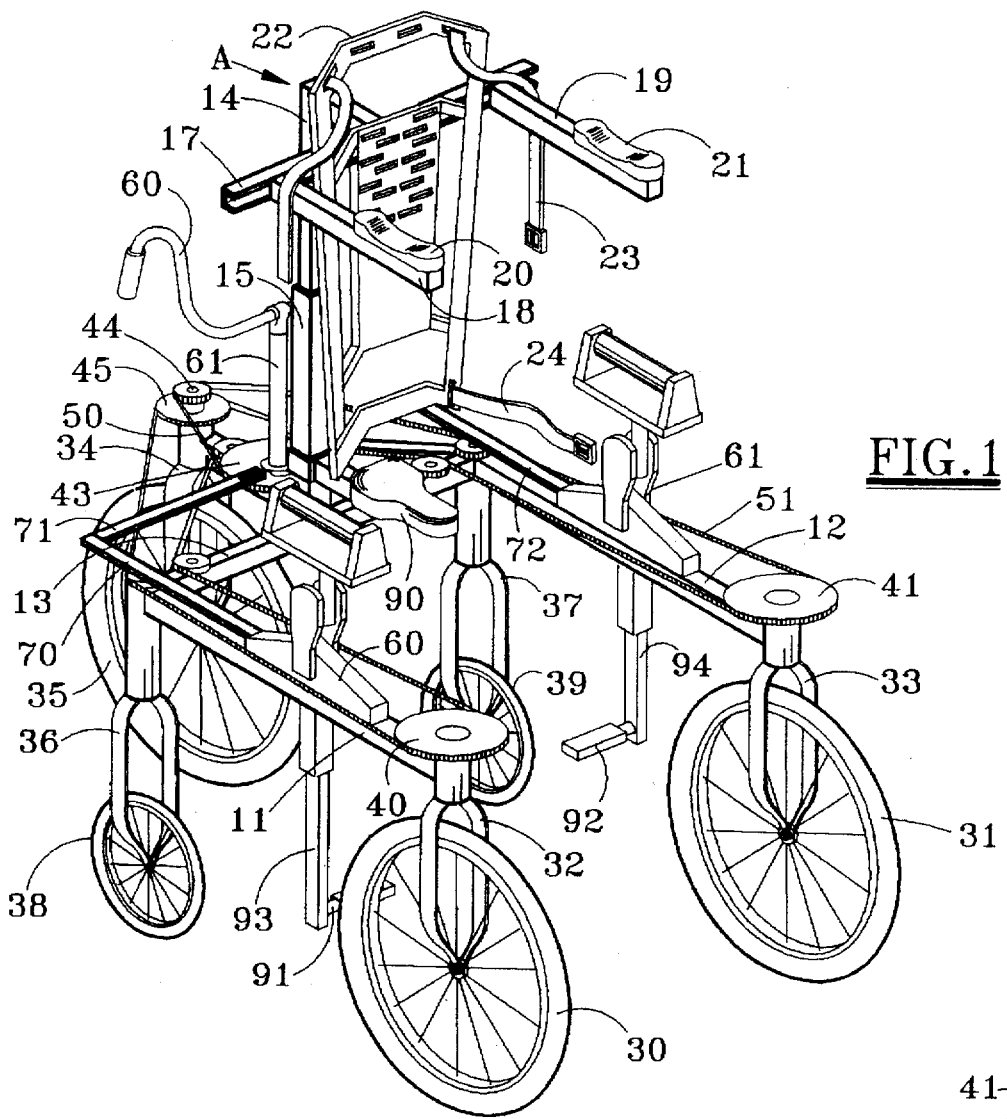
FIG. 1 is a perspective view of the walking apparatus of the present invention according to a preferred embodiment thereof.
Figure 2:
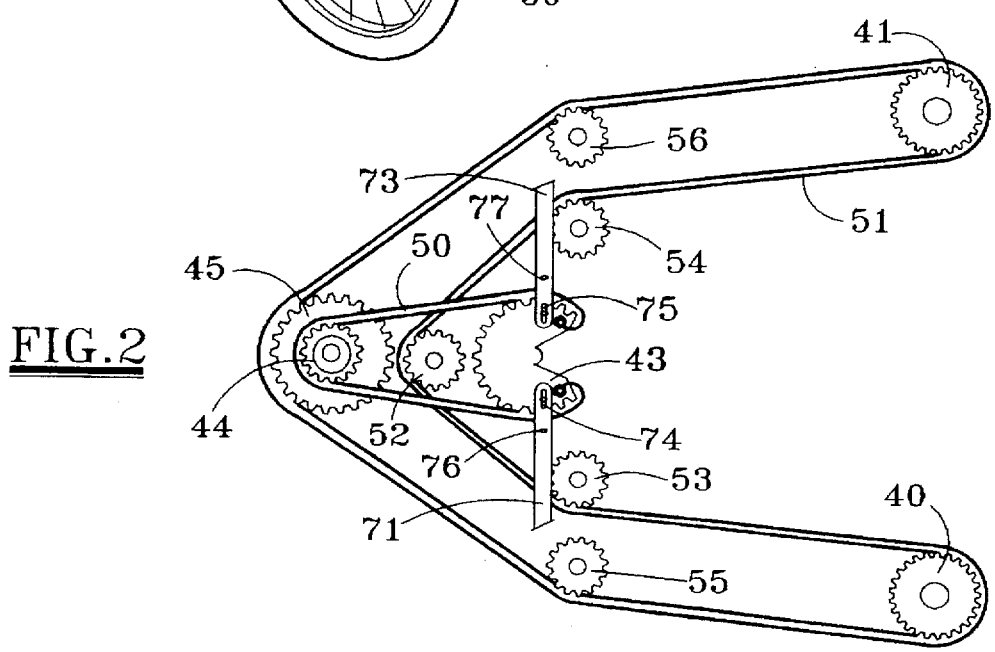
FIG. 2 is a schematic representation of steering apparatus utilized with the walking apparatus of the present invention, according to a preferred embodiment thereof.

Referring first to FIGS. 1–4, there is shown walking apparatus A for assisting a disabled person to walk, according to a preferred embodiment of the invention. The apparatus A comprises a frame assembly which includes a pair of lower horizontal members 11, 12 between which the disabled person may stand. These members may be connected near the rear of the machine by a connecting horizontal member 13. The frame also comprises a vertical member 14 extending upwardly for disposition behind the persons back. The vertical member 14 may be telescopically received by a tubular support 15. The member 14 and tubular supports may be provided with corresponding vertically spaced horizontal holes for engagement by a pin 16 (see FIG. 3) so that the height of the vertical member 14 may be adjusted for the height of the person using the apparatus A.

Attached to the vertical member 14 is a cross support 17 from which a pair of upper horizontal members 18 and 19 project for disposition under the arm pits or base of the arms of the person utilizing the apparatus A. These horizontal members 18, 19 may be provided with pads 20, 21 such as the pads used on the upper ends of crutches. Some type of back support 22 may also be attached to the cross support 17. The back support 22 may be provided with shoulder straps 23 and belts 24 to help strap the user in proper position, if needed.

A seat or saddle 90 may be attached to the vertical member for disposition between the users legs. When standing the user may utilize leg pressure against the saddle 90 in steering and for stabilization. When seated, the user may rest his weight on the saddle 90.

The apparatus is also provided with a forward pair of ground engaging wheels 30, 31 each of which is attached to a wheel mount 32, 33 which extends downwardly from the forward ends of the horizontal members 11, 12. The wheel mounts 32, 33 are provided with bearings and other components (not shown) which allow the wheels 30, 31 to pivot about a vertical axis.

Attached to the rear of the frame by a fixed wheel mount 34 is a rear ground engaging wheel 35. Also attached to the frame by wheel mounts 36, 37 are a pair of smaller side wheels 38, 39. The side wheels 38, 39 may be slightly elevated from the ground and simply provide side stability to the apparatus A.

Attached to the upper end of the forward wheel mounts 32, 33 is a pair of driven sprockets 40, 41. The sprockets 40, 41, when rotated, will cause rotation of the wheel mounts 32, 33 about vertical axes for pivoting of the forward wheels 30, 31 to steer the apparatus A in a desired direction. Attached to the frame, for rotation about a vertical axis near the rear thereof, is a driving sprocket 43. Mounted to the rear of the driving sprocket 43 is a transmitting sprocket assembly which includes a small sprocket 44 and a larger sprocket 45 coupled for simultaneous rotation about a vertical axis which may be coaxial with the vertical axis of the rear wheel mount 34. However, the rotation of the rear wheel mount 34 does not depend on rotation of the transmitting sprocket 44, 45, these sprockets being mounted for independent rotation.

The driving sprocket 43 is connected through a chain assembly to the driven sprockets 40, 41. The chain assembly includes a first chain 50 connecting the driving sprocket 43 to the smaller upper transmitting sprocket 44. A second chain 51 connects the larger lower transmitting sprocket 45 to the driven sprockets 40, 41. A number of idler sprockets 52, 53, 54, 55, 56 carried by the frame engage the second chain 51 to form a continuous loop from one driven sprocket 40 to the transmitting sprockets 44, 45 and to the other driven sprocket 41.

There are two independent means of rotating the driving sprocket 43 and thus steering the apparatus A. The first is a pair of handle bars 60 which is attached by a vertical support 61 to the driving sprocket 43. This means of steering the apparatus A is to allow a person other than the occupant of the apparatus A to steer the apparatus A. The person, standing to the rear of the apparatus A, grips the handle bar 60 to turn the support column 61 and the driving sprocket 43. When the driving sprocket 43 is turned, it causes movement of the chain 50, driving the sprocket 44 and its attached larger sprocket 45. The larger transmitting sprocket 45 in turn moves the chain 51 causing the driven sprockets 40, 41 at the forward end of horizontal frame members 11, 12 to rotate. Rotation of the driven sprockets 40, 41 in turn rotate wheel mounts 32, 33 causing the forward wheels 30, 31 to pivot about vertical axes to steer the apparatus in the desired direction.

The second independent means of steering the apparatus A is the primary steering apparatus to be utilized by the disabled person occupying the apparatus A. This apparatus involves a pair of handle assemblies 60, 61 each one of which is attached to a corresponding one of the pair of horizontal frame members 11, 12 and a pair of arm assemblies which connect the handle assembly 60, 61 to the driving sprocket 43.

Each of the arm assemblies comprises first and second arm members 70, 71 and 72, 73 articulatingly connected to each other. One end of each of the first arm members 70, 72 is connected to a corresponding one of the handle assemblies 60, 61. One end of each of the second arm members 71, 73 is connected to the driving sprocket 43 in a pin and slot connection 74, 75. In addition, the second arm members 71, 73 are connected at fixed pivot points 76, 77 to the frame. Each of the handle assemblies 60, 61 are engageable by the hands of the apparatus occupant for forward or rearward movement relative to the horizontal frame supports 11, 12. Thus, forward movement of handle assembly 60, and simultaneous rearward movement of handle assembly 61 would, through the corresponding arm assemblies 70, 71 and 72, 73 cause the driving sprocket 43 to rotate in a clockwise direction, as viewed from FIGS. 2 and 4. Rotation of the driving sprocket 43 would then through chain 50, gears 44, 45 and chain 51 cause the driven sprockets 40, 41 to also rotate in a clockwise direction as viewed in FIGS. 2 and 4. This would cause the wheels 30, 31 to pivot about vertical axes of the wheel mounts 32, 33 steering the apparatus to the right. Of course, opposite movement of the handle assembly 60 to the rear and handle assembly 61 forward, will cause the wheels 30, 31 to pivot in a direction steering the apparatus to the left.

Figure 3:
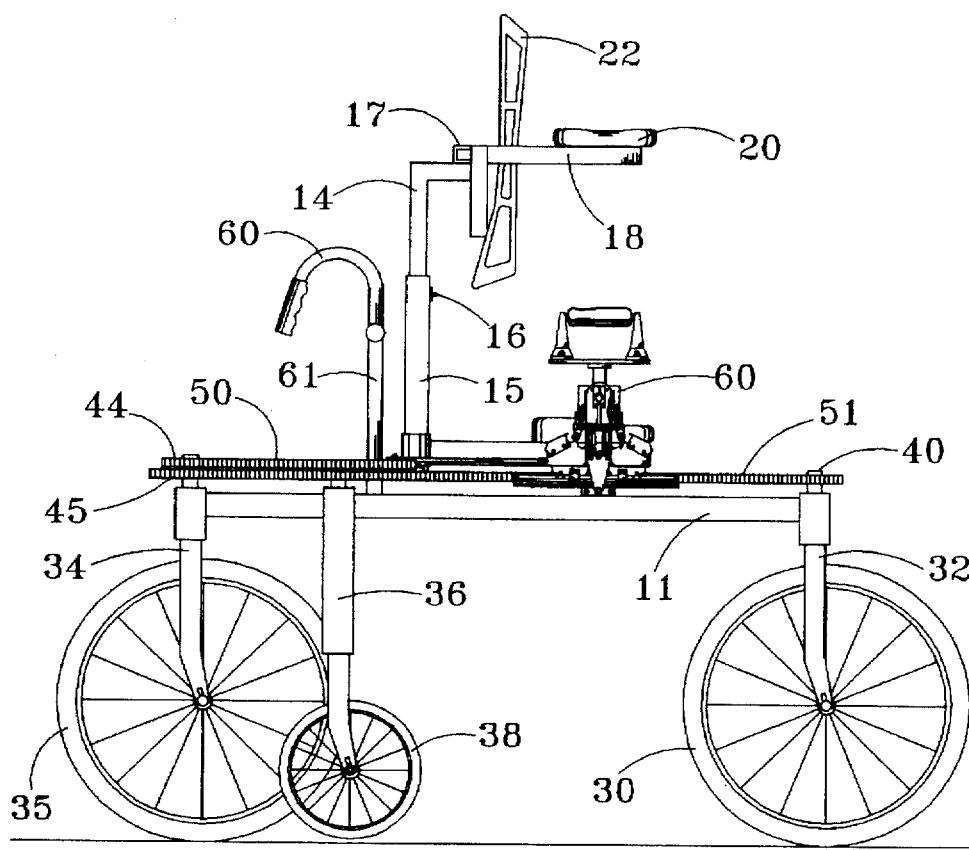
FIG. 3 is a side elevation view of the walking apparatus of FIG. 1.
Figure 4:
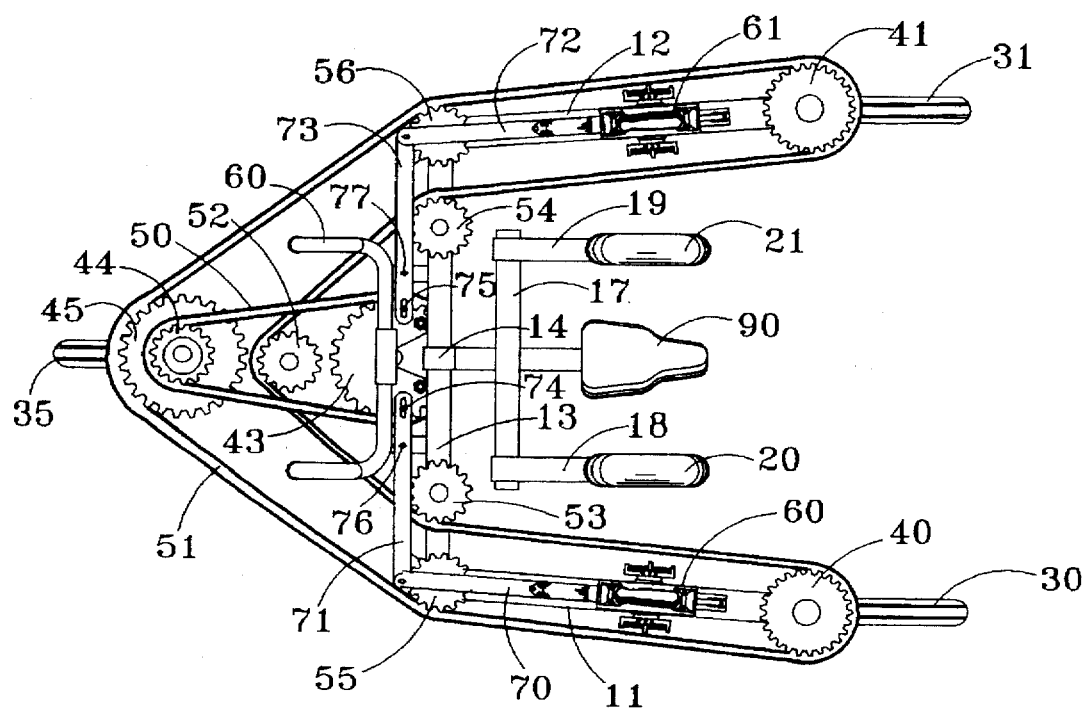
FIG. 4 is a top plan view of the walking apparatus of FIG. 1.
Figures 5, 6:
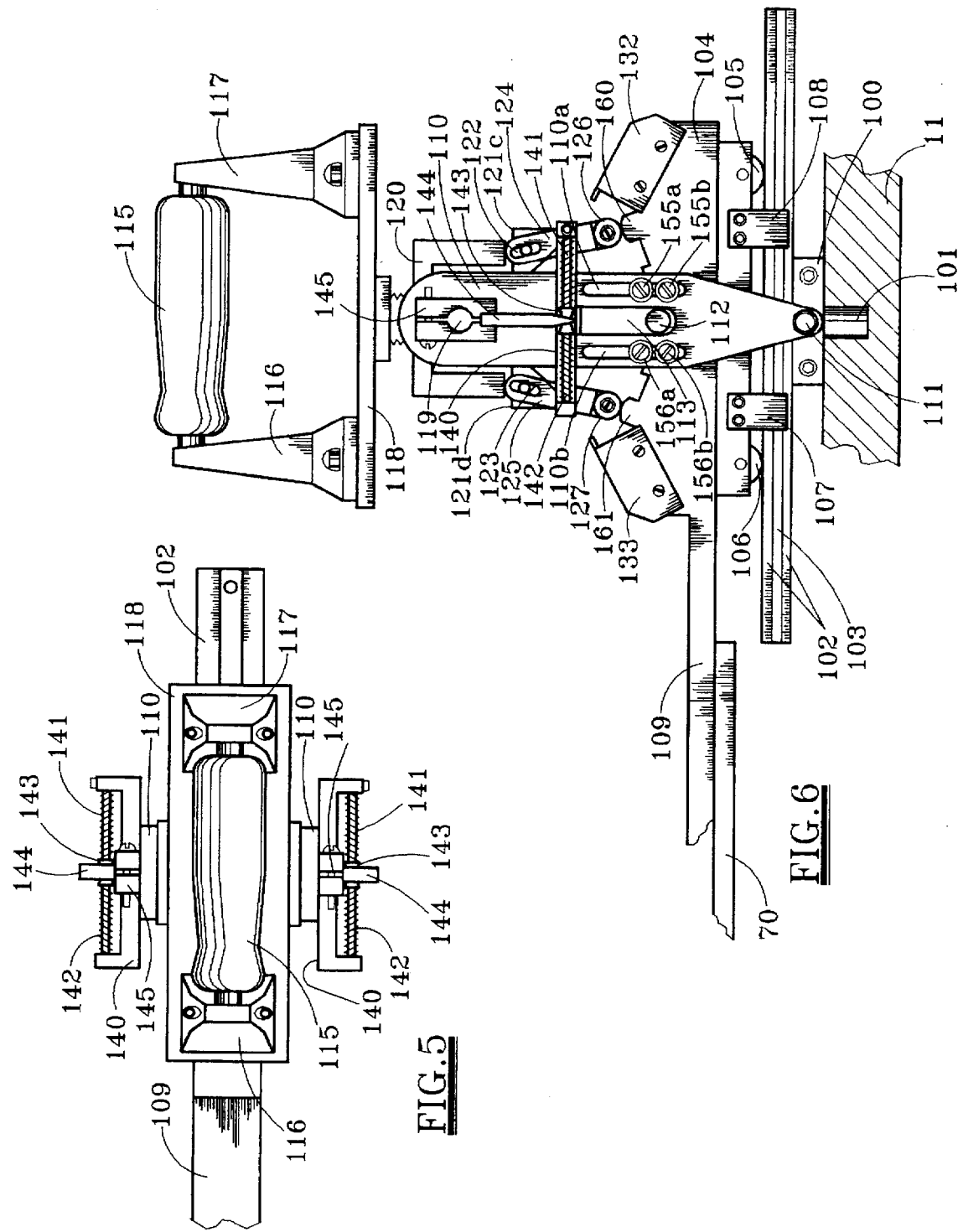
FIG. 5 is a top plan view of a handle assembly utilized in steering apparatus of the present invention, in a neutral or intermediate position, according to a preferred embodiment of the invention.
FIG. 6 is a side elevation view of the handle assembly of FIG. 5, again in a neutral position, according to a preferred embodiment thereof.

Obviously, the handle assemblies 60, 61 are very important parts of the walking apparatus A. The assembly and operation of the handle assemblies 60, 61 will be explained in greater detail with reference to FIGS. 5, 6, 7 and 8 which will show one of these assemblies 60 in much greater detail. FIGS. 5, 6 and 8 show the handle assembly 60 in a neutral or intermediate position, such as illustrated in FIGS. 1, 3 and 4. FIG. 7 illustrates the handle assembly 60 in a forward position to steer the apparatus A to the right as described in the previous paragraph.

The handle assembly 60 comprises a stationary base 100 which is attached to the corresponding horizontal frame member 11. Actually the base 100 is attached by a pin 101 which engages a hole provided in the frame member 11. The fit is such as to allow a limited amount of pivoting about the vertical axis of the pin 101. Surmounted on the base 100 are one or more elongated plates 102 which provide guide grooves 103 on opposite sides thereof. Resting on the plates 102 is a carriage 104 which is provided with wheels 105 and 106. The wheels 105, 106 rollingly engage the plates 102 to allow the carriage 104 to move longitudinally between an intermediate position, such as illustrated in FIGS. 6 and 8, and forward and rearward terminal positions, the forward terminal position of which is illustrated in FIG. 7. Guides 107, 108 attached to the carriage 104 are provided with inward projections (not shown) which engage the guide groove 103 to guide the carriage 104 in its movement along the plates 102. A rearward extending portion 109 of the carriage 104 is connected to the forward arm 70 of the arm assembly 70, 71 (see also FIGS. 1 and 4). A pair of connector arms 110 on opposite sides of the carriage 104 connect the base 100 and a plunger block 121 by lower and upper pivot connections, 111 and 119, respectively. Each connector arm is provided with a slot 113 engaged by a pin 112 extending outwardly from carriage 104. Thus, movement of connector arm 110 will, through the pin 112 and slot 113 connection, cause the carriage 104 to move along the upper surface of plates 102.

Connected to the plunger block 121 is support plate 118 which supports a handle member 115 engageable by the hand of the person utilizing the apparatus for pivoting the connector arm 110 between intermediate positions such as FIG. 6 and forward and rearward terminal positions, the forward terminal position of which is shown in FIG. 7. The handle 115 may be supported by vertical supports 116, 117 attached to the support plate 118. The support plate 118 and the plunger block 121 are both connected by pivot connection 119 to the connector arm 110. An inverted U-shaped plunger positioner 120 is pivotally attached to connector arm 110 by a pivot connection 120a. (See FIG. 8).

The plunger block 121 has, extending from both sides thereof support surfaces 121a, 121b which, when viewed in side elevation, are V-shaped. (See FIG. 8 portions of which have been removed for better viewing inner components). These support surfaces engage a corresponding V-shaped trough provided on the upper portion of a pair of support blocks 150 carried by connector arms 110. Extending downwardly from the support blocks 150 are a pair of support rods 151, 152 which telescopically engage corresponding tubular rod guides 153, 154 attached by fasteners 155a, 155b and 156a, 156b to corresponding connector arms 110. The connector arms may be slotted, 110a, 110b, to receive fasteners 155a, 155b, 156a, 156b to allow upward or downward adjustment of rod guides 153, 154. Surrounding rods 151, 152 between support block 150 and rod guides 153, 154 are a pair of springs 157, 158. The springs 157, 158 bias the support blocks 150 upwardly. Spring tension is adjusted by upward or downward adjustment of rod guides 153, 154.

Attached to lower extensions 121a, 121b of the plunger block 121 by pin and slot connections 122, 123 are forward and rearward plungers 124, 125 at the lower ends of which are small wheels 126, 127. Provided by the carriage 104 are corresponding wheel guides 132, 133. The outer forward wheel guide 132 has been removed in FIG. 7 to illustrate more clearly operation of the plungers 124, 125. The carriage 104 also provides forward and rearward tabs 160, 161 on which plunger wheels 126, 127 rest when in the neutral or intermediate position of FIG. 6. Supported on carriage 104, inwardly of each tab 160, 161 is an upwardly projecting pin 162, 163. Defined between corresponding tabs and pins, 160, 162 and 161, 163, are corresponding notches 164, 165 which may receive a corresponding plunger wheels 127 or 126 when the connector arm 110 moves in a forward or rearward direction as desired.

Also carried in recessed holes by carriage 104 are forward and rearward pins 170, 171 and corresponding springs 172, 173 which bias the pins 170, 171 in an upward direction. In the intermediate or neutral position of FIGS. 6 and 8, these pins 170, 171 project on the outer sides of plunger wheels 126, 127. It will be noted that the ends of each pin 170, 171 are shaped to provide upwardly and outwardly curved surfaces. Engaging these curved surfaces of pin 170, 171 are the ends of levers 174, 175 pivotally connected at 176, 177 to carriage 104.

It will also be noted that spring assemblies are provided on the outside of each connector arm 110. (See FIGS. 6 and 7). With reference to connector arm 110, the spring assembly comprises a spring mount 140 and a pair of springs 141, 142. The spring mount is attached to the connector arm 110 by a centrally located pivot (not shown). The springs 141, 142 and a spring divider 143 are mounted of a rod supported at opposite ends of spring mount 140. The spring divider is engaged by the lower forked end of a spring arm 144 which is fixed by a clamp connector 145 to horizontal shaft which forms part of the pivot connection 119. This shaft rotates upon movement of plunger block 121. Therefore, if plunger block 121 moves forwardly, as shown in FIG. 7, the fork at the end of spring arm 144 will compress spring 141 and allow spring 142 to expand. The opposite is true if the plunger block 121 moves rearwardly. In either case, springs 141, 142 bias the connector arms 110, and other components of the handle assemblies 60, toward the neutral or intermediate portion of FIG. 6.

Movement of the handle assembly 60 from the neutral or intermediate position of FIG. 6 to the forward terminal position of FIG. 7, and the effect thereof will now be described. To effect such movement, the handle 115 is grasped by the person using the apparatus and pushed forward. As this occurs, the spring loaded pin 170 (See FIG. 8) engages plunger wheel 126 forcing the plunger 124 upwardly until the pin in the pin and slot connection 122 rests at the lower portion of the slot. (See FIG. 7). This point is below the center of radius of the rounded upper end of plunger 124. The inner surface of the upper end of the plunger 124 therefore engages a corresponding surface on the plunger block 121 preventing the plunger 124 from rotating about the pin and slot connection 122 and effectively causing the plunger 124, plunger block 121 and the V-shaped support surfaces 121a, 121b thereof to move as a rigid composite.

As these members continue to move forwardly, gravity and the engagement of plunger positioner 120 with the upper end of the opposite plunger 125 will cause the plunger wheel 127 to drop into the notch 165 allowing the plunger 125 to move downwardly until the pin of the pin and slot connection 123 is disposed in the upper most portion of the slot (not visible in FIG. 7). At this point the pin of the pin and slot connection 123 is concentrically disposed with the center radius of the upper rounded end of the plunger 125, allowing the plunger 125 to rotate, in a clockwise direction, as the connector arm 110 and the plunger block 121 move forward to the forward terminal position of FIG. 7. As these components move forwardly, the plunger wheel 126 is guided in a forward and downwardly inclined path by the guide member 132. Thus, the plunger block 121 and the handle 115 attached thereto is guided between an intermediate substantially horizontal position and a slightly and upwardly inclined position away from the horizontal, as the connector arm 110 moves from its intermediate position of FIG. 6 to the forward terminal position of FIG. 7. The slight inclined positioning of the handle 115 makes it easier for the person in the apparatus to manipulate the handle.

Forward movement of the handle 115 and pivoting of the connector arm 110 in the clockwise direction effected thereby causes the carriage 104 to move forwardly on plates 102. The carriage 104 and its connector arm 109 cause the arm 70 to move forward, pivoting arm 71 of the arm assembly 70, 71 (see FIGS. 1 and 4) so that the steering assembly will steer the apparatus to the right.

As the forward movement of the plunger block 121 occurs, the plunger block 121 and its V-shaped support surfaces 121a, 121b rotate relative to connector arm 110. Thus the V-shaped support surfaces 121a, 121b move from correlative engagement with support surfaces provided on in the V-shaped trough of support block 150 until the left hand support surface 121a is free of the "V" trough and the right hand support surface 121b moves from the right side of the "V" trough to the left side thereof. The spring mounting of the support block 150 allows this to occur.

After steering to the right is completed, the handle 115 may be easily returned to the neutral or intermediate position of FIGS. 6 and 8 since the spring biasing of springs 141, 142, 157, 158 naturally biases all components of the handle assembly 60 toward the neutral or intermediate position of FIGS. 6 and 8. As these components are returned to the neutral or intermediate position, the plunger wheel 126 rolls along the inclined lever 174 forcing the spring loaded member 170 downwardly against its spring 172 so that the wheel 126 will be allowed to move past the spring plunger 170 to the position resting on the tab 160, as viewed in FIG. 8.

If steering to the left is desired, then naturally the handle 115 would be moved to the rear and the connector arm 110, plunger block 121 and plungers 124, 125 would be moved to a rearward terminal position in a similar fashion. As this occurs, the plunger 125 becomes stiff and the plunger 124 freely rotates to allow the handle member 115 to move between a substantially horizontal position, slightly and upwardly inclined away from the horizontal position, as the connector arm 110 moves from its intermediate or neutral position of FIGS. 6 and 8 to a rearward terminal position (now shown).

Thus, the walking apparatus of the present invention provides unique apparatus for assisting a disabled person to walk. The frame supports a forward pair of ground engaging wheels and at least one rear ground engaging wheel. Steering means, including sprockets, chains, arm assemblies and unique handle assemblies are provided to pivot the forward pair of wheels about a vertical axis to steer the apparatus in a desired direction. The handle apparatus is unique in providing as near effortless as possible manipulation by the user to steer the apparatus in the desired direction.

A single embodiment of the invention has been described herein. However, the invention may be altered in a number of ways. As an example, it may be provided with foot rests 91, 92 so that the user can sit on the seat or saddle 90 and place his feet on the rests 91, 92 while the apparatus is steered from the rear by another person utilizing the handle bar 60. (See FIGS. 1, 3 and 4). The foot rests 91, 92 may be mounted in telescopic supports 93, 94 so that they may be retracted when the apparatus A is being solely steered by the disabled person using the apparatus. This illustrates only one of the many variations of the invention which may be made without departing from the spirit thereof. Accordingly, it is intended that the scope of the invention be limited only by the claims which follow.

I claim:

1. Walking apparatus for assisting a disabled person to walk, said apparatus comprising:

a frame comprising a pair of lower horizontal members between which said person may stand and a vertical member extending upwardly for disposition behind said persons back;

a forward pair of ground engaging wheels each one of which is attached to a forward wheel mount which extends downwardly from a forward end of one of said lower horizontal members, said wheel mount allowing said wheels to pivot about a vertical axis;

at least one rear ground engaging wheel attached to a rear wheel mount attached to the rear of said frame; and steering means mounted on said frame, connected to said forward wheel mounts and manipulatable by the hands of said person for pivoting of said forward pair of wheels about said vertical axis to steer said apparatus in a desired direction; said steering means comprising a pair of driven members each one of which is attached to one of said forward wheel mounts for rotation about said vertical axis to effect said pivoting of said forward wheels, a driving member mounted at the rear of said frame for rotation about a vertical axis, flexible means connecting said driving member with said driven members and means for rotating said driving member so that said flexible means rotates said driven members, pivoting said pair of forward wheels to steer said apparatus in said desired direction.

2. The walking apparatus of claim 1 in which said frame comprises a pair of horizontal members attached to said vertical frame member for disposition under the arm pits of said person.

3. The walking apparatus of claim 1 in which said means for rotating said driving member comprises a pair of handle assemblies each one of which is attached to a corresponding one of said pair of lower horizontal frame members and a pair of arm assemblies, each one of which connects one of said handle assemblies to said driving member, each of said handle assemblies being engageable by one of said persons hands for movement thereof, movement of said handle assemblies effecting movement of said arm assemblies, said driving member, said flexible connecting means and said driven members to pivot said pair of forward wheels for steering said apparatus.

4. The walking apparatus of claim 3 in which each of said arm assemblies comprises first and second arm members, articulatingly connected to each other, one end of said first arm member being connected to a corresponding one of said handle assemblies and one end of said second arm member being connected to said driving member.

5. The walking apparatus of claim 4 in which said second arm member is also pivotally attached, between its connections to said driving member and said first arm member, to a fixed point on said frame.

6. The walking apparatus of claim 5 in which said one end of said second arm member is provided with either of a slot or pin which is engaged by either a pin or slot, respectively, carried by said driving member, said pin and slot providing said connection by which said second arm is connected to said driving member.

7. The walking apparatus of claim 3 in which each pair of said handle assemblies comprises a relatively stationary base attached to said corresponding horizontal frame member, a carriage connected to one of said arm assemblies and longitudinally moveable between an intermediate position and forward and rearward terminal positions and a connector arm connected to said stationary base and to said carriage, said connector arm being pivotal about said connection with said stationary base between corresponding intermediate and forward and rearward positions to move said carriage between said intermediate and said forward and rearward terminal positions to effect movement of said arm assembly for steering of said apparatus.

8. The walking apparatus of claim 7 in which each pair of said handle assemblies includes a handle member attached to said connector member and engageable by said persons hand for pivoting of said connector member between said intermediate and said forward and rearward positions, said handle member being substantially horizontal when said connector member is in said intermediate position.

9. The walking apparatus of claim 8 in which said handle member is pivotally attached to said connector arm to allow said handle member to remain substantially horizontal to slightly inclined as said connector member is moved between said intermediate and said forward and rearward terminal positions.

10. The walking apparatus of claim 9 including handle biasing means engageable with said handle member biasing said handle member toward said substantially horizontal position when said connector arm is in its intermediate position.

11. The walking apparatus of claim 10 including guide means carried by said handle member and said carriage, guiding said handle member upon movement of said connector arm between said intermediate and said forward and rearward positions, between said substantially horizontal position and positions slightly and upwardly inclined away from said horizontal position as said connector member moves from said intermediate position to either of said forward and rearward positions.

12. The walking apparatus of claim 7 including connector biasing means carried by said connector arm biasing said connector arm toward said intermediate position.

13. The walking apparatus as set forth in claim 1 in which said steering means includes a transmitting member carried on said frame, a first flexible member connecting said driving sprocket to said transmitting member and a second flexible member connecting said transmitting member to said driven members.

14. The walking apparatus of claim 13 in which said steering means includes a plurality of idler members carried by said frame and engaging said second flexible member to form a continuous loop from one driven member to said transmitting member, near the rear of said frame, to the other of said driven members.

15. The walking apparatus of claim 1 in which said means for rotating said driving member comprises a handle member extending upwardly from said driving member and engageable by the hands of another person standing behind said walking apparatus for applying rotational forces to said driving member.

16. The walking apparatus of claim 1 including seat means attached to said frame for disposition between said persons legs, said seat means assisting said disabled persons, when standing, in steering and stabilization of said walking apparatus by leg pressure applied thereto; and, when seated, providing means on which said person may rest his weight.

17. The walking apparatus of claim 16 including foot rests attached to said frame, allowing said person, when seated on said seat means, to rest his feet above the ground.

18. The walking apparatus of claim 1 including back supporting means attached to said vertical frame member and to which said persons back may be strapped.

19. The walking apparatus of claim 18 in which said vertical frame member is vertically extendable and retractable to position said back supporting means at the most comfortable position.

* * * * *